United States Patent [19]

Colombo

[11] 4,435,345
[45] Mar. 6, 1984

[54] PROCESS FOR THE PRODUCTION OF A CONTINUOUS SHEET OF FOAMED SYNTHETIC, THERMOPLASTIC POLYMER BY EXTRUSION

[75] Inventor: Roberto Colombo, Turin, Italy

[73] Assignee: Lavorazione Materie Plastiche L.M.P. S.p.A., Turin, Italy

[21] Appl. No.: 316,383

[22] Filed: Oct. 29, 1981

[30] Foreign Application Priority Data

Nov. 5, 1980 [IT] Italy .................. 68689 A/80

[51] Int. Cl.³ .......................... B29D 27/00
[52] U.S. Cl. ...................... 264/53; 264/101; 264/DIG. 13; 425/378 R; 425/817 C
[58] Field of Search ......... 264/53, 51, 101, DIG. 13; 425/817 C, 378 R

[56] References Cited

U.S. PATENT DOCUMENTS

| | | | |
|---|---|---|---|
| 2,576,911 | 12/1951 | Amos | 264/53 |
| 2,669,751 | 2/1954 | McCurdy et al. | 264/53 |
| 2,838,801 | 6/1958 | De Long et al. | 264/53 X |
| 2,948,665 | 8/1960 | Rubens et al. | 264/53 X |
| 3,431,163 | 3/1969 | Gilbert | 264/53 X |
| 3,431,164 | 3/1969 | Gilbert | 264/53 X |
| 3,804,574 | 4/1974 | Gatto | 264/101 X |
| 3,822,331 | 7/1974 | Cogliano | 264/53 X |
| 3,922,328 | 11/1975 | Johnson | 264/101 X |
| 3,927,160 | 12/1975 | Medley | 264/101 X |
| 3,931,379 | 1/1976 | Cruson et al. | 264/101 X |
| 4,154,785 | 5/1979 | Inui et al. | 264/53 X |
| 4,284,596 | 8/1981 | Inokuchi et al. | 264/53 X |

OTHER PUBLICATIONS

Brydson, J. A., "Plastics Materials", Princeton, N.J., D. Van Nostrand, ©1966, pp. 33 and 34.
"Whittington's Dictionary of Plastics", by Lloyd R. Whittington, Stamford, Conn., Technomic, ©1968, Preface, pp. 18, 114, 115, 116, 117, 221, 251.

Primary Examiner—Philip E. Anderson
Attorney, Agent, or Firm—Sughrue, Mion, Zinn, Macpeak & Seas

[57] ABSTRACT

The density of the foam is reduced and the thickness of the sheet obtained by extrusion/expansion is increased by grasping the sheet between confining walls which are permeable to gas and movable together with the sheet, and which diverge from each other in the direction of advance of the sheet, and by applying a subatmospheric pressure to the faces of the sheet and through the said walls while the sheet is in its thermoplastic state, after which the foam is gelled by cooling to stabilize the thickness achieved.

4 Claims, 4 Drawing Figures

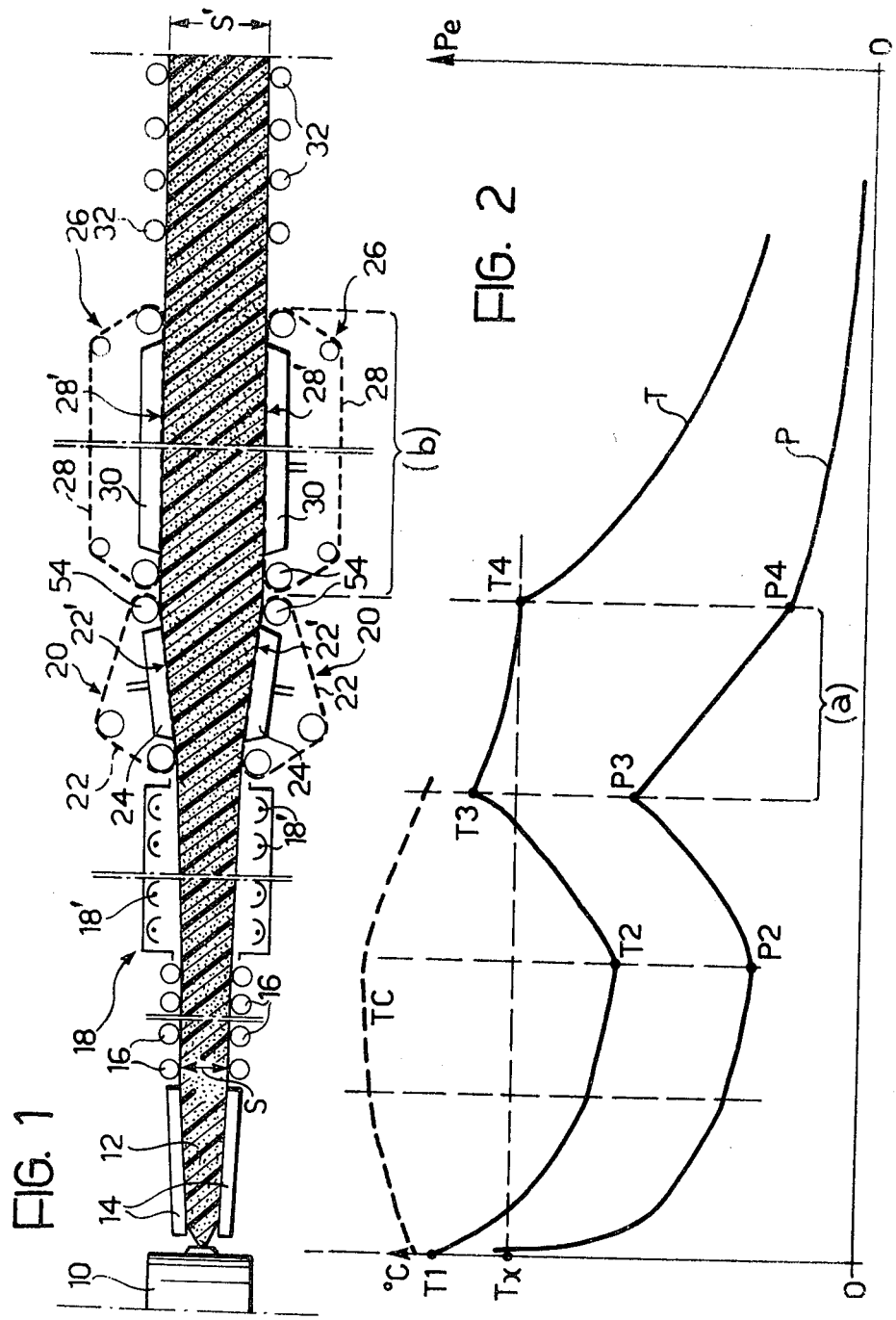

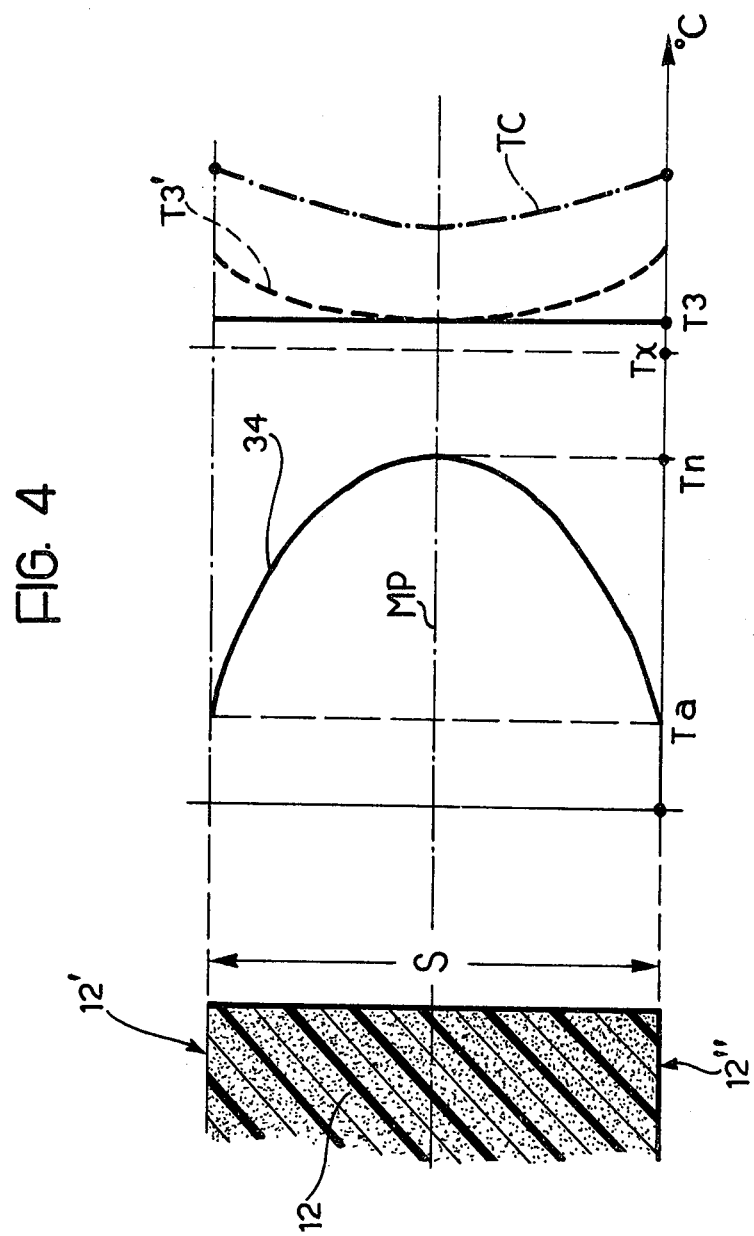

PROCESS FOR THE PRODUCTION OF A CONTINUOUS SHEET OF FOAMED SYNTHETIC, THERMOPLASTIC POLYMER BY EXTRUSION

BACKGROUND OF THE INVENTION

A continuous sheet of foamed synthetic, thermoplastic polymer such as polystyrene, polyethylene, or polypropylene, is commonly obtained by an extrusion/expansion process. In this process, an extruder forms, under high pressure, a molten mass of polymer in which a volatile expansion agent, for example a Freon or n-pentane is uniformly dissolved or dispersed, and the mass is extruded through a straight, narrow slit. This results in a decompression which liberates the expansion agent in the form of gas bubbles dispered substantially uniformly in the polymer matrix, which produces two effects:

a substantial increase in the thickness and width of the flow of material leaving the extrusion slit and cooling of the foamed flow obtained, which in turn produces the increase in viscosity of the polymeric matrix which is necessary to prevent the pressure developed by the expansion agent from causing rupture of the foam cells (and hence collapse of the foam).

Further cooling, applied externally, is necessary to harden the foam. For this purpose, typically, the two faces of the foamed sheet leaving the extruder are guided into contact with cold surfaces, which may diverge from each other slightly in the direction of advancement of the sheet and which limit the expansion of the foam in a direction perpendicular to the plane of the sheet and simultaneously gel the foam. After further cooling (generally with air), the longitudinal edges of the sheet are trimmed and the sheet is cut transversely into panels of a desired length, but the present invention is not concerned with this stage.

For reasons known to the expert in the art, the general trend is to make foamed sheets with the lowest possible density, for example less than 0.05 g/cc and preferably less than 0.03 g/cc. in order to achieve this result, in addition to ensuring the precise metering of the large quantity of expansion agent and an extremely uniform distribution thereof in the molten mass in the extruder, the final temperature of the mass before extrusion must be controlled very accurately in order to raise the viscosity of the mass to a high value, very close to (but not less than) the "critical viscosity". By "critical" viscosity is meant that value of the viscosity below which the pressure of the gas trapped in the foam would rupture the cell walls. Clearly, the higher the viscosity of the mass above the critical viscosity, the smaller is the degree of expansion of the foam and hence the greater the density of the foamed sheet obtained. On the other hand, since the expansion at the outlet from the extruder is accompanied by "endogenic" cooling due to the change in state of the expansion agent from a liquid (or solid) to a gas, the viscosity of the polymeric matrix increases, as a result, and restricts the expansion process even if the pressure of the gas within the matrix is still substantially above atmospheric. It follows that both the density of the foam and the thickness of the sheet obtained are limited correspondingly. It should be noted that the thickness of the sheet cannot be increased at will by widening the extrusion slit appropriately in that, by so doing, the counterpressure exerted by the slit on the molten mass which reaches it would be reduced with consequent premature and detrimental liberation of the expansion agent in the gaseous form within the extruder. This means (inter alia) that it is impossible to obtain very thick foamed sheet with a low-capacity extruder. Even with medium-capacity extruders (200 to 250 kg/hour of material worked) it is difficult to make a sheet which is more than 3 to 4 cm thick.

In order to remedy this disadvantage by some method, it is known to make use of "post-heating" of the previously cooled sheet; this consists of passing the sheet through an oven in which the temperature of the sheet is raised appropriately to give a certain plasticity of the polymeric matrix. Under these conditions the gas trapped in the matrix increases in pressure and is able to enlarge the cells somewhat, with a corresponding increase in the thickness of the sheet and corresponding lowering of the density. However, the increase in thickness obtained in this manner is relatively small, it being difficult to increase it beyond about 10% (in round figures). In order to obtain thicknesses of the order of 6 to 7 cm it is known to make use of the simultaneous extrusion, through two separate slits, of two layers of foam which are superimposed and bonded together immediately downstream of the respective slits. In this case, however, it is extremely difficult to make the two foams identical to each other so that the composite sheet obtained tends to curve or twist. In addition, it is also difficult to achieve complete and effective mutual bonding over the entire interface.

The main object of the present invention is to avoid the disadvantages mentioned above. Further objects and advantages will become evident from the following description.

SUMMARY OF THE INVENTION

The process according to the invention for the production of a continuous sheet of foamed synthetic thermoplastic polymer (particularly polystyrene, polyethylene and polypropylene) by extrusion of a molten mass of the polymer in which a volatile expansion agent is dissolved or dispersed, is characterised by the stages of: (a) producing a progressive increase in the thickness of the foamed sheet during its advance by passing the sheet between two opposing zones which apply a subatmospheric pressure to the respective faces of the sheet while the sheet is in the thermoplastic state and (b) continuing to apply a subatmospheric pressure to the said faces under conditions of constant thickness and cooling the sheet externally to stabilise the thickness achieved.

According to one advantageous embodiment, the thickness of the sheet in the stages (a) and (b) is controlled by gripping the sheet between confining walls which are permeable to gas and applied against the respective faces of the sheet, and applying the subatmospheric pressure through the said walls while the latter are advanced in synchronism with the sheet. This can easily be achieved in practice by means of belt conveyors with gas-permeable belts. In the first pair thereof, in stage (a), the active passes of the conveyors diverge from each other in the direction of advance of the sheet in order to produce the desired, progressive increase in the thickness of the incremental sections of the sheet gripped between these passes. In the second pair, in stage (b), the active passes of the conveyors are parallel to each other in order at least substantially to preserve the increased thickness of the sheet while the latter is cooled.

The stages (a) and (b) may be applied to the sheet during its formation, that is immediately downstream of the extrusion slit. However, since the temperature distribution throughout the thickness of the sheet during its formation is difficult to maintain reliably at a given value and hence varies rapidly with the expansion of the gas, an embodiment is preferred in which the two faces of the foamed sheet leaving the extruder are guided into contact with cold surfaces to produce gelling of the foam, after which, according to the invention:

the sheet, treated in this manner, is passed through a heating zone before the temperature of the core of the sheet has fallen substantially below the incipient softening point of the polymer, and the heating of the sheet in the heating zone is carried out so as to bring the entire thickness of the sheet to at least substantially the same temperature, between the said incipient softening point and the critical viscosity point (as defined above), after which the stages (a) and (b) are applied to the sheet.

Preferably the said temperature of the core, expressed in degrees C., is less than the incipient softening point of the polymer and is at least half (preferably about two thirds) of the extrusion temperature. Thus, with this subsequent heating, the desired, uniform distribution of the temperature throughout the thickness of the sheet is achieved more securely.

BRIEF DESCRIPTION OF THE DRAWINGS

In the appended drawings:

FIG. 1 is a schematic sectional view, on a longitudinal vertical plane, of a plant putting the process according to the invention into effect;

FIG. 2 is a diagram coordinated with FIG. 1 in which several temperature and pressure curves (on the ordinate) are shown, purely by way of example, with reference to the path of the foam sheet (on the abscissa);

FIG. 4 illustrates curves showing the temperature distribution throughout the thickness of the sheet immediately upstream and immediately downstream of the heating stage which precedes stage (a).

DETAILED DESCRIPTION OF THE PREFERRED EMBODIMENT

Figure 3:
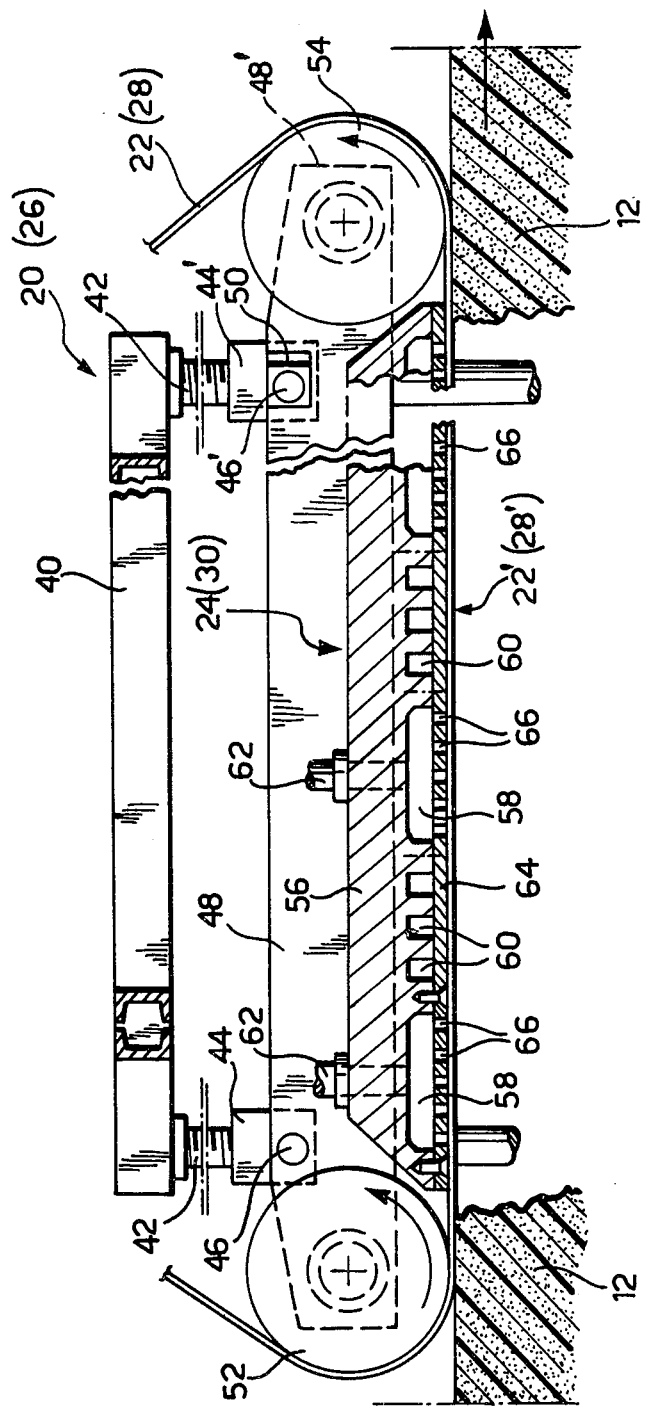
FIG. 3 is a schematic, longitudinal vertical sectional view of one of four belt conveyors used in FIG. 1.

In FIG. 1 the thickness of the foamed sheet is deliberately exaggerated compared to its path, for reasons of clarity of illustration. In this figure, by 10 is shown the extrusion head from which the sheet 12 of synthetic thermoplastic foam is extruded. From the moment of expansion of the foam, the sheet 12 is guided in known manner between two flat, forming plates 14 cooled by means of internal circulation of water or oil, over which the two faces of the sheet under formation slide. Usually the plates 14 diverge somewhat from each other in the direction of advancement of the sheet 12. At the outlet from this stage, the sheet 12 has a thickness S, for example 3 cm, and is relatively hard so that it can be grasped by two series of drawing rollers 16. In the zone of the drawing rollers, the sheet 12 is freely exposed to the atmosphere and thus undergoes further cooling. Immediately downstream of the drawing rollers is an oven 18, disposed in the path of the sheet 12, and comprising two series of infra-red radiators 18' directed against the two faces of the sheet. As it passes through the oven, the sheet increases slightly in thickness, for example to about 3.5 cm, but this increase has no bearing on the purposes of the process of the invention.

Immediately downstream of the oven 18 is a pair of belt conveyors 20. The belt 22 of each conveyor is permeable to gas and the active passes 22' of the conveyors contact the respective faces of the foamed sheet 12 and diverge from each other in the direction of advance of the sheet. Preferably, the belts 22 are each constituted by a closely-woven mesh of steel or bronze wires. For example, a suitable sheet is as follows:

warp: wire diameter 0.3 mm; 16 wires/cm;
weft: wire diameter 0.1 mm; 90–100 wires/cm.

The rear face of each of the active passes 22' slides in contact with the corresponding face of a suction box 24, and the two boxes are connected to a vacuum pump (not shown), for example a liquid annulus pump. Hence, the two faces of the foamed sheet 12 adhere to the respective active passes 22' so that the thickness of the sheet is forcedly and progressively increased, the sheet being under the temperature conditions previously stated (and which will be further explained below) which are such that the foam is plastically deformable in this stage. Thus, in practice, the thickness of the foamed sheet 12 is increased by up to three times or even more.

Immediately downstream of the conveyors 20 is a further pair of conveyors, indicated by 26, also comprising belts 28 of woven metal mesh, the active passes of which are indicated by 28' and which slide on suction boxes 30 connected to a vacuum pump. The active passes 28' of these conveyors 26, however, are parallel to each other and the suction boxes are cooled by an internal circulation of cold water. Hence, in this stage (stage (b)), the vacuum in the suction boxes 30 maintains the faces of the sheet adhering to the respective active passes 28' solely to preserve the thickness S' obtained in the previous stage (a) while the foam of the sheet is cooled intensely by the boxes 30 through the belt 28.

The belts 22, 28 of the conveyors 20 and 26 are driven at a linear velocity synchronised with the rate of advance of the foamed sheet 12, that is, so as not to brake nor accelerate the sheet.

At the outlet from stage (b) the sheet is grasped between drawing rollers 32 and further cooled by air (optionally by means of fans, not illustrated) before being passed to the final stages of longitudinal trimming and transverse cutting.

In the diagram of FIG. 2, the temperature corresponding to incipient softening of the foam, the value of which depends on the polymer used, is indicated by $T_x$. The curve showing the temperature corresponding to the critical viscosity of the polymer, as defined previously, is indicated by $TC$. Since the critical viscosity, that is the limit capacity of the cells to resist bursting, is dependent on the effective pressure ($P_e$ in the diagram) of the gas in the cells, the temperature $TC$ is not constant but varies along its path. At the moment of extrusion, the gas pressure is high, whereby the critical viscosity must also be high, which means that the temperature $TC$ must be low to produce this viscosity.

In FIG. 2, the temperature of the foam is indicated by $T$ while the pressure of the gas in the foam cells is indicated by $P$.

The polymeric mass is extruded at the temperature $T_1$, which is greater than $T_x$ and as close as possible to $TC$ for the reasons already explained. Immediately the mass expands between the plates 14, both the temperature and the pressure fall. More particularly, the temperature $T$ falls below $T_x$ to a value $T_2$ at the inlet to the oven 18, while the pressure falls to a value P2. The corresponding TC value is relatively high since the gas pressure in the cells is low.

In FIG. 4 (in which the median horizontal plane of the foamed sheet 12, on which lies the "core" of the sheet, is indicated by MP) the curve 34 shows the temperature distribution throughout the thickness of the sheet immediately before the inlet to the oven 18. It is seen from this curve that, while the two faces 12', 12" of the sheet 12 are (more or less) at the ambient temperature Ta, the temperature Tn of the core is substantially higher than Ta.

Consequently, the gas pressure in the cells is also greater in the core than in the surface layers and the critical temperature (corresponding to the critical viscosity) varies correspondingly. In the process according to the invention, the temperature Tn of the core at the inlet to the oven 18 is preferably less than Tx; however, its value expressed in degrees C. is preferably at least half the extrusion temperature (T1 in FIG. 2), advantageously about ⅔ of T1. This is achieved by regulating the cooling of the foamed sheet 12, in its path between the extruder and the oven 18 appropriately. On the other hand, heating in the oven 18 is carried out to raise the temperature of the foam to the value T3 within the range in which the foam is plastic, that is between Tx and TC, so that the value T3 is as constant as possible throughout the thickness of the sheet (see FIG. 4). Infra-red radiation which penetrates the sheet and hence allows the curve 34 to be straightened much better, for example, than by heating with air is particularly suitable for this purpose (see radiators 18' in FIG. 1). Furthermore, the number of radiators used and the power supplied are preferably adjustable; this helps to stop the temperature distribution throughout the thickness of the sheet 12 at the outlet from the oven 18 from taking up the form of the curve T3' in FIG. 4, which is acceptable only as long as the variations in temperature along this curve are small (depending on the polymer used) and at least substantially less than the difference Tn-Ta. Naturally, in each case, the curve T3' is below the curve TC.

Thus, the viscosity of the polymeric matrix and the pressure of the gas in the foam cells are brought to values which are substantially constant throughout the thickness of the sheet, and, it is under these conditions, that the sheet enters stage (a), FIG. 2, of the process according to the invention. In this stage, the forced dilation produced by the active passes 22' of the conveyors 20 produces an elongation of the foam cells perpendicular to the plane of the sheet 12 while the cell walls stretch plasticly, so that the gas in the cells is decompressed to a value P4. The decompression of the gas in turn produces a lowering of the foam temperature to a value T4 (see FIG. 2). If the value T3 is only slightly greater than Tx, the value T4 readily falls below Tx, which is obviously an advantage in that it means that, at the outlet from stage (a), the foamed polymeric matrix has already started its hardening phase (gelling). It follows, typically, that the temperature at the inlet to the oven 18 corresponds to the curve T3' (FIG. 4). Hence, according to an advantageous embodiment of the invention, it is convenient to apply cooling (preferably moderate) in stage (a), as well, by circulating a cooling liquid through the suction boxes 24 in this stage. By this means, the curve T3' is flattened in the passage through stage (a) to the advantage of the structural uniformity of the foam.

In stage (b), both the temperature T and the pressure P (FIG. 2) continue to fall due to the cooling applied through the belts 28, so that the thickness of the sheet is finally stabilised.

If the invention is carried out in the manner described above, one succeeds in achieving, without any particular problems, monolithic sheets of polystyrene foam having a thickness of 10 to 12 cm. Furthermore, thanks to the forced dilation in stage (a), the density of the foam is substantially reduced, typically to values of the order of 0.02 g/cc.

In FIG. 3, one of the conveyors 20 (or 26) is illustrated, by way of example. In this Figure, the numerals in parentheses relate to the components described previously with reference to the conveyors 26. Each conveyor has a fixed frame including screw-threaded, upright columns 42 on which support heads 44, 44' provided with internal screw-threading rotatable on the threads of the columns are movable vertically. Each of the heads carries a transverse suspension pin 46, 46' respectively for a strong, longitudinal, side-frame member 48. It will be understood that a pair of the said columns, with the respective heads, pins and side-frame members is disposed on each of the two sides of the conveyor. The pin 46' of the head 44, is engaged in a cursor 50 guided longitudinally in the side frame member 48 so that the downstream end of the latter may be raised or lowered independently of the level of the pin 46 which supports the other end, as required in stage (a) of FIG. 1. For stage (b) the cursor 50 is not necessary. The ends of the two side-frame members 48 support guide rollers 52, 54 for the belt 22, the roller 54 being driven, by means not shown, at a peripheral speed which is synchronised with that of the drawing rollers 32 of FIG. 1.

The suction box 24 comprises a strong metal plate 56 bolted laterally to the two side-frame members 48 and extending over the entire length of the active pass 22' of the belt. In practice, the plate 56 may be formed in several separate, consecutive sections, to facilitate manufacture and assembly. In the front face of the plate 56, turned towards the active pass 22', are suction chambers 58 extending transverse the belt and alternating with groups of cooling ducts 60 also extending transverse the belt. The chambers 58 are connected to the vacuum pump by means of connectors 62 while other connectors (not shown) are provided for connecting the ducts 60 to a circuit for the circulation of cooling liquid. To the said front face of the plate 56 is sealed a sheet of steel 64 which, in correspondence with each suction chamber 58, has groups of suction holes 66 distributed over the width of the belt 22.

At the beginning of the process according to the invention the conveyor 20 of FIG. 3 is in the horizontal position illustrated so that the foamed sheet 12 arriving from the oven 18 comes into contact with the active pass 22' over the entire length thereof, after which the suction is started (and possibly the cooling). These conditions are maintained until the sheet of foam 12 has passed beyond the conveyors 26 in the stage (b), and then the latter are also connected to the suction pump and to the cooling circuit. At this point, the screws of the heads 44' (FIG. 3) of the conveyors 20 of stage (a) are rotated to displace the outlet ends of these conveyors away from each other to the desired extent (FIG. 1) to produce the desired increase in thickness of the sheet 12. At the same time, all the heads 44, 44' of the two conveyors 26 of stage (b) are actuated simultaneously and in synchronism with the heads 44' of the conveyors 20 of stage (a) to space the conveyors of stage (b) apart vertically to the same extent as the outlet ends of the conveyors of stage (a). From this moment, the process according to the invention occurs in the manner described, until the extrusion is finished.

What is claimed is:

1. In a process of producing a continuous sheet of foamed synthetic thermoplastic polymer comprising extruding a foamable melt of the polymer through a slit and guiding the sheet during foaming with the opposite faces thereof in contact with respective cold surfaces thereby to cool said faces to below the gelling point of the polymer, the improvement further comprising the steps of:
   (a) passing the so foamed sheet through a heating zone before the temperature at the core of the sheet has fallen substantially below the incipient softening point of the polymer, thereby to raise the temperature of the sheet to a value which is at least substantially constant throughout the thickness of the sheet and is between said incipient softening point and the critical viscosity point of the polymer,
   (b) applying sub-atmospheric pressure to the opposite faces of the sheet exiting from said heating zone of step (a), through a pair of mutually diverging moving walls which are permeable to gas while advancing said walls in synchronism with the sheet thereby to temporarily adhere the said faces of the sheet to the respective walls and progressively increase the thickness of the sheet during its advance,
   (c) continuing to apply sub-atmospheric pressure to the opposite faces of the sheet exiting from step (b) through a pair of mutually parallel moving walls which are permeable to gas and are advanced in synchronism with the sheet while cooling the sheet, thereby to keep the faces of the sheet adhering to the respective walls and maintaining the thickness of the sheet constant until the foam is consolidated.

2. The process of claim 1, wherein the temperature in °C. at the core of the sheet submitted to step (a) is below the incipient softening point of the polymer but amounts to at least half of the extrusion temperature value.

3. The process of claim 1, wherein, in step (c), the sheet is cooled by cooling the said mutually parallel walls.

4. A process according to claim 3, wherein the mutually diverging walls in step (b) are also cooled.

* * * * *